(12) United States Patent
Penniman et al.

(10) Patent No.: US 11,961,536 B2
(45) Date of Patent: Apr. 16, 2024

(54) METHODS AND APPARATUS FOR DETERMINING DIRECTIONALITY ASSOCIATED WITH SOUNDS DETECTED BY A VEHICLE

(71) Applicant: Nuro, Inc., Mountain View, CA (US)

(72) Inventors: Joseph Daniel Penniman, Santa Clara, CA (US); Peter Jon Kardassakis, Mountain View, CA (US); Matthew Jeremy Sarett, San Francisco, CA (US); Adithya C. Ganesh, Mountain View, CA (US); Jia Pu, Menlo Park, CA (US)

(73) Assignee: Nuro, Inc., Mountain View, CA (US)

( * ) Notice: Subject to any disclaimer, the term of this patent is extended or adjusted under 35 U.S.C. 154(b) by 267 days.

(21) Appl. No.: 17/544,127

(22) Filed: Dec. 7, 2021

(65) Prior Publication Data
US 2022/0180895 A1    Jun. 9, 2022

Related U.S. Application Data

(60) Provisional application No. 63/123,282, filed on Dec. 9, 2020.

(51) Int. Cl.
*G10L 25/78* (2013.01)
*B60R 11/02* (2006.01)
*H04R 5/027* (2006.01)

(52) U.S. Cl.
CPC .......... *G10L 25/78* (2013.01); *B60R 11/0247* (2013.01); *H04R 5/027* (2013.01)

(58) Field of Classification Search
CPC ....... G10L 25/78; G01S 5/18; G01S 7/52001; G01S 2205/01; B60R 11/0247; H04R 5/027; H04R 3/005; H04R 1/406; H04R 2499/13; H04R 1/265; G08G 1/0965; G08G 1/166; H04L 2012/40273
See application file for complete search history.

(56) References Cited

U.S. PATENT DOCUMENTS

| | | | |
|---|---|---|---|
| 2016/0355125 A1* | 12/2016 | Herbert | G08G 1/0965 |
| 2018/0211528 A1* | 7/2018 | Seifert | H04R 1/406 |
| 2018/0350391 A1* | 12/2018 | Moore | H04R 1/406 |
| 2019/0294169 A1 | 9/2019 | Shabtai et al. | |
| 2019/0355251 A1* | 11/2019 | Silver | H04R 3/005 |

OTHER PUBLICATIONS

Fazenda, Bruno, et al., "Acoustic Based Safety Emergency Vehicle Detection for Intelligent Trasnport Systems", https://citeseerx.ist.psu.edu/viewdoc/download?doi=10.1.1.399.7544&rep=rep1&type=pdf.

* cited by examiner

*Primary Examiner* — Yogeshkumar Patel

(57) ABSTRACT

According to one aspect, a method for detecting a location from which at least one sound signal originates, includes obtaining, on a microphone array of a vehicle, the at least one sound signal from a sound source, the sound source being external to the vehicle, the vehicle having a plurality of sides. The method also includes identifying, based on at least one measure associated with the at least one sound signal as obtained on the microphone array, at least a first side of the plurality of sides as being closest to the sound source.

23 Claims, 17 Drawing Sheets

METHODS AND APPARATUS FOR DETERMINING DIRECTIONALITY ASSOCIATED WITH SOUNDS DETECTED BY A VEHICLE

PRIORITY CLAIM

This patent application claims the benefit of priority under 35 U.S.C. § 119 to U.S. Provisional Patent Application No. 63/123,282, filed Dec. 9, 2020, and entitled "METHODS AND APPARATUS FOR DETERMINING DIRECTIONALITY ASSOCIATED WITH EMERGENCY VEHICLES," which is incorporated herein by reference in its entirety.

TECHNICAL FIELD

The disclosure relates to providing systems for use with autonomous vehicles. More particularly, the disclosure relates to a system which uses microphone arrays mounted on the exterior of an autonomous vehicle to detect a location of an emergency vehicle.

BACKGROUND

Autonomous vehicles often encounter obstacles in the course of driving on roadways. Obstacles may include pedestrians and other vehicles, e.g., emergency vehicles. Emergency vehicles may have sirens activated and lights flashing to warn road users of their presence. As autonomous vehicles generally may not have human drivers onboard to respond appropriately to the presence of emergency vehicles, the ability for autonomous vehicles to detect the presence of emergency vehicles is important to substantially ensure that autonomous vehicles do not inadvertently impede the ability for emergency vehicles to reach their destinations.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
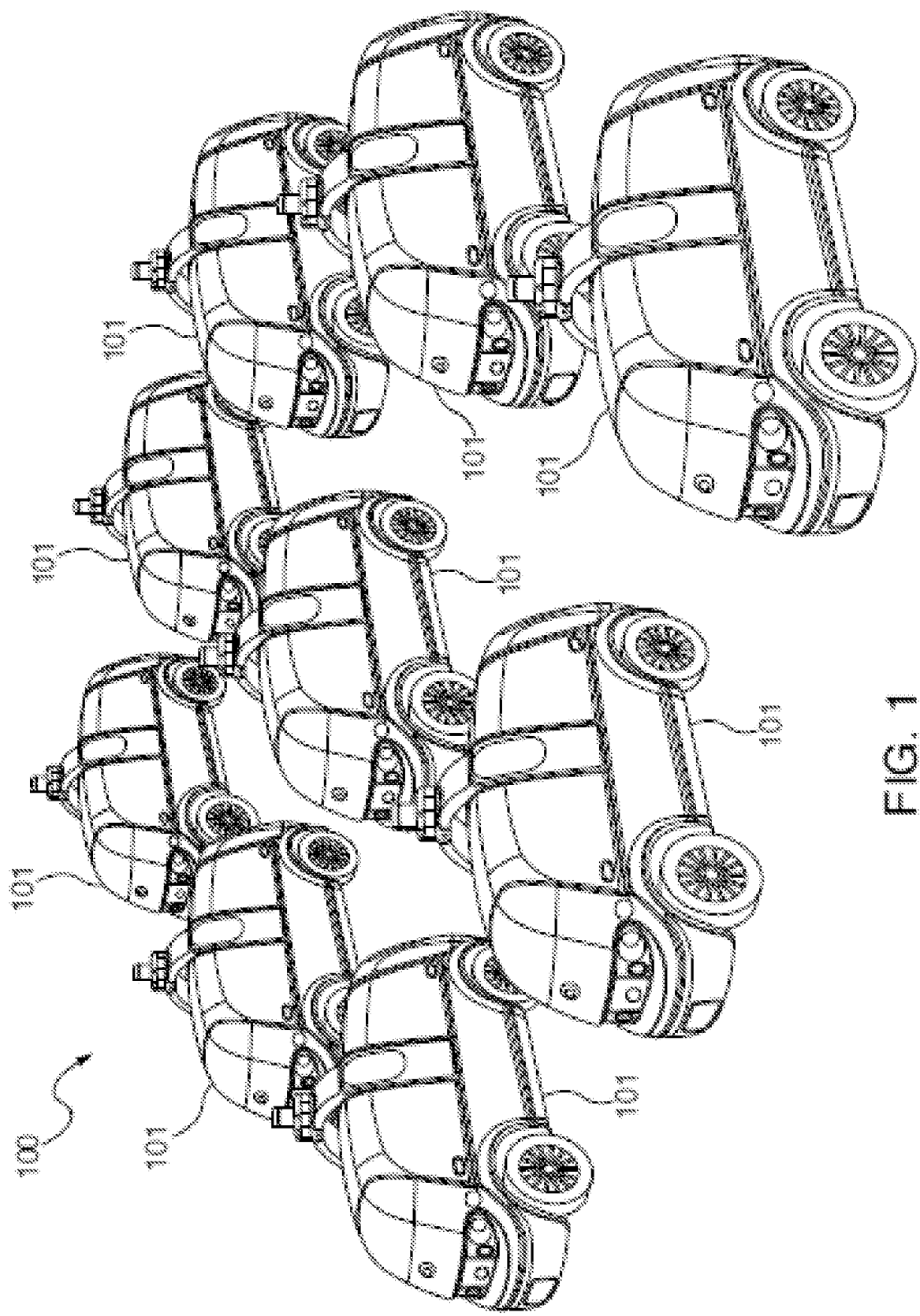
FIG. 1 is a diagrammatic representation of an autonomous vehicle fleet in accordance with an embodiment.

In one embodiment, a method for detecting a location from which at least one sound signal originates, includes obtaining, on a microphone array of a vehicle, the at least one sound signal from a sound source, the sound source being external to the vehicle, the vehicle having a plurality of sides. The method also includes identifying, based on at least one measure associated with the at least one sound signal as obtained on the microphone array, at least a first side of the plurality of sides as being closest to the sound source. The microphone array may include at least a first microphone mounted on a first side of the plurality of sides and at least a second microphone mounted on a second side of the plurality of sides, and the at least one measure may be a signal strength. The first microphone obtains the at least one sound signal at a first signal strength and the second microphone obtains the at least one sound signal at a second signal strength.

In accordance with another embodiment, logic is encoded in one or more tangible non-transitory, computer-readable media for execution and when executed, the logic is operable to obtain, on a microphone array of a vehicle, the at least one sound signal from a sound source, the sound source being external to the vehicle, the vehicle having a plurality of sides. The logic is also operable to identify, based on at least one measure associated with the at least one sound signal as obtained on the microphone array, at least a first side of the plurality of sides as being closest to the sound source. The vehicle may be an autonomous vehicle, and the logic may be further operable to determine whether to cause the vehicle to take an action in response to the at least one sound signal.

According to yet another embodiment, a vehicle includes a chassis and a plurality of sides, the plurality of sides being supported on the chassis. The vehicle also includes a microphone array, a processor, and logic. The microphone array including a plurality of microphones mounted on the plurality of sides, the microphone array configured to capture at least one signal from a source external to the vehicle. The processor is carried on the chassis, and the logic, when executed by the processor, is operable to process the at least one signal captured by the microphone array to determine at least one direction from which the at least one signal originates.

Multiple arrays of microphones may be positioned at different locations on an exterior of an autonomous vehicle to facilitate a determination of a direction from which an emergency vehicle is approaching. Measuring acoustic differences such as differences in sound intensities between adjacent microphones may enable a direction from which a siren is coming from to be determined. Multiple arrays of microphones may effectively cooperate to determine a direction from which a signal is emitted. Microphone arrays may be located on the front, on the sides, and on the back of a vehicle.

DESCRIPTION

The ability to detect the presence of emergency vehicles or, more generally, vehicles with onboard sirens, enables an autonomous vehicle to respond appropriately. In addition, the ability to determine a direction from which an emergency vehicle is approaching the autonomous vehicle further enables the autonomous vehicle to respond in a suitable manner. For example, if an autonomous vehicle is able to detect that there is an emergency vehicle behind the autonomous vehicle, the autonomous vehicle may be able to pull over to the side of the road to allow the emergency vehicle to pass. When an autonomous vehicle is unable to detect the presence of an emergency vehicle, and the direction from which the emergency vehicle is approaching, the autonomous vehicle may inadvertently become an obstacle to the emergency vehicle.

By using arrays of microphones, the directionality associated with an active siren of an emergency vehicle may be identified Determining a difference in intensity, for example, of siren signals received on each microphone included in an array of microphones mounted on an autonomous vehicle, enables the general location of an emergency vehicle with an active siren may be identified relative to the autonomous vehicle. For example, if two microphones in an array capture signals such that a first microphone receives a signal with a higher intensity than the signal received by a second microphone, the implication may be that the source of the signal is closer to the first microphone than to the second microphone. Utilizing multiple arrays of microphones further enables additional, an/or more specific, locations to be identified, e.g., a siren may be determined to be to the front and to the left of an autonomous vehicle. In one embodiment, signals received by different microphone arrays located on different sides of a vehicle may be compared as part of a localization process. Additionally, time differences relating to when a signal arrives at different microphones in a single array, may be processed as part of a localization process.

An autonomous vehicle which includes externally mounted microphones may generally be part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system. The sensor system may include microphones arranged to pick up sounds external to each autonomous vehicle 101.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
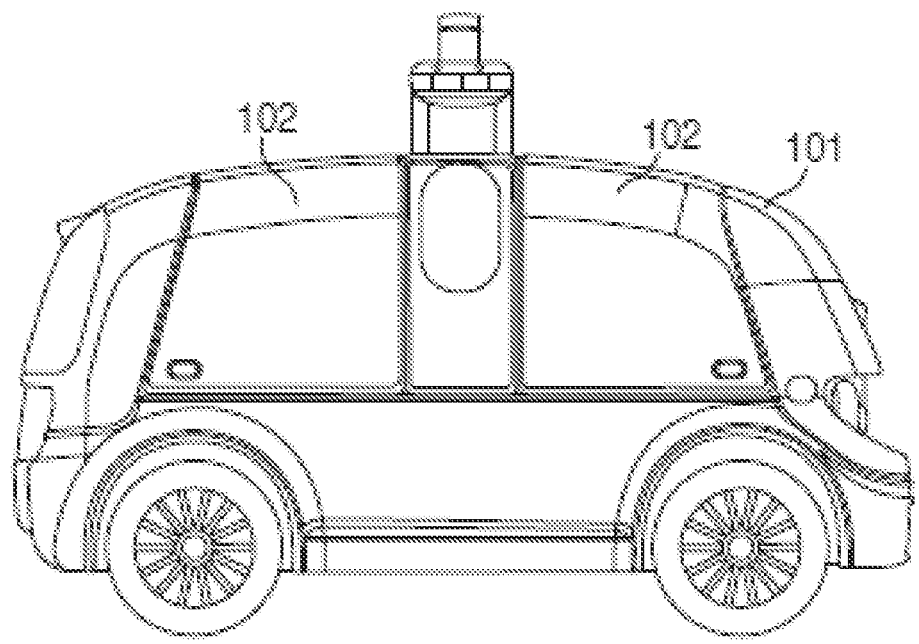
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. The chassis may support or include sides of autonomous vehicle 101, as for example a front side, a right side, a left side, and a rear side of autonomous vehicle 101. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
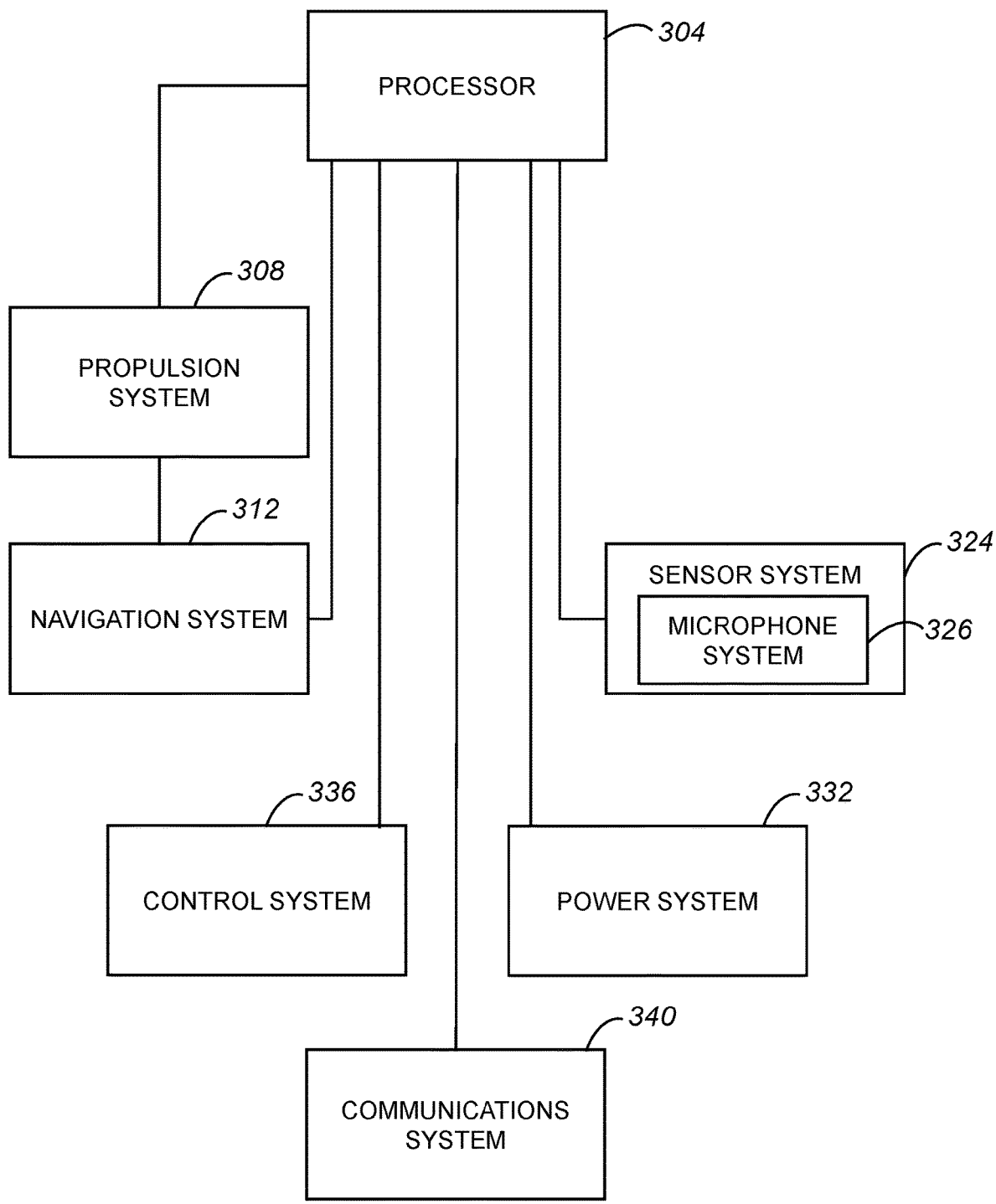
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

A microphone system 326 is included in sensor system 324. Microphone system 326 may include a plurality of microphones, or any devices which are capable of converting sound into an electrical signal. Microphones of microphone system 326 may be mounted on an exterior of autonomous vehicle 101, and arranged to capture or otherwise obtain sounds from an environment around autonomous vehicle 101. In one embodiment, microphones of microphone system 326 may be arranged in arrays on the exterior of autonomous vehicle and may capture sounds emitted from or otherwise generated by sirens on emergency vehicles. One embodiment of microphone system 326 will be discussed below with reference to FIG. 10.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4:
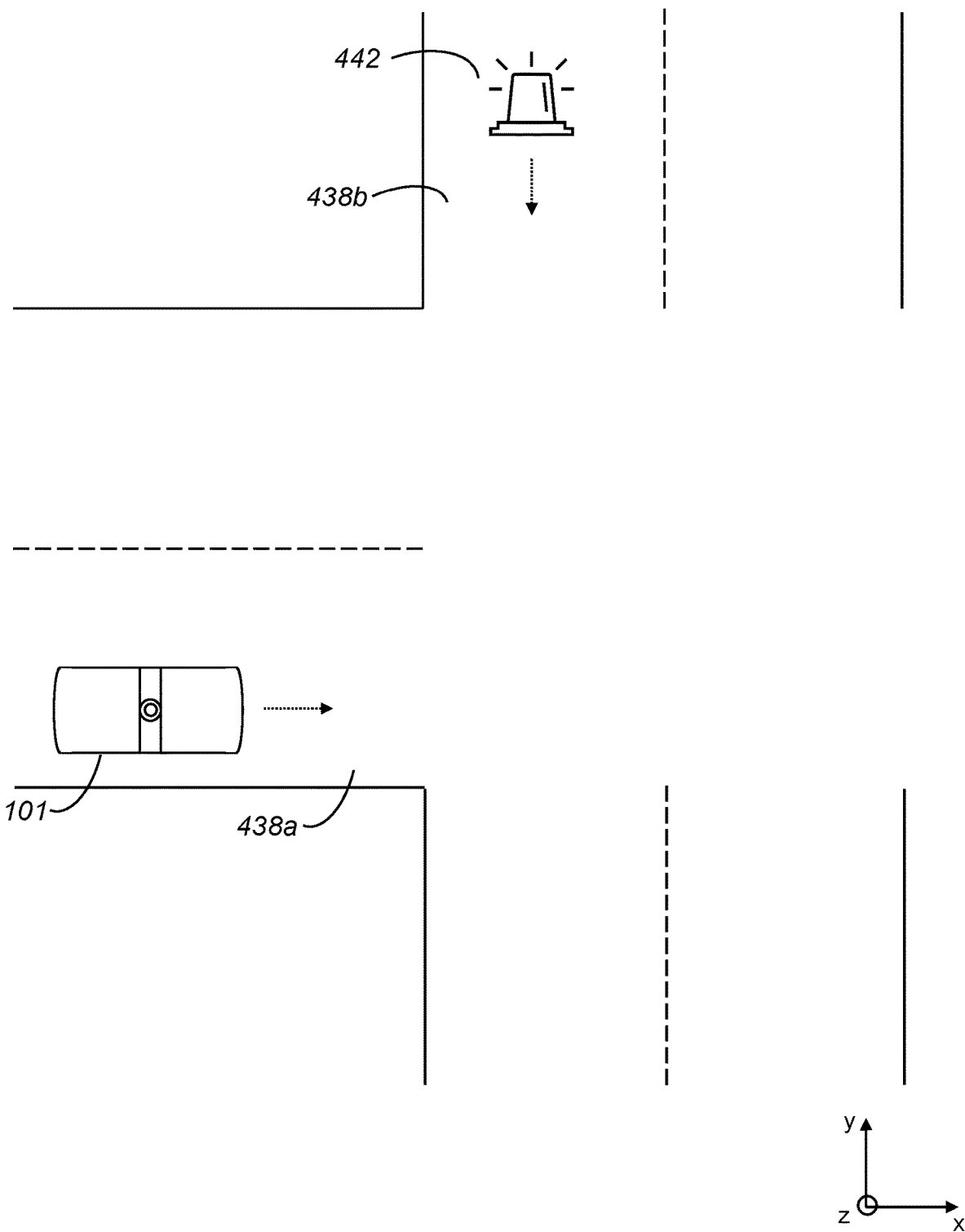
FIG. 4 is a diagrammatic representation of an autonomous vehicle, e.g., autonomous vehicle 101 of FIGS. 2 and 3, in the vicinity of a vehicle or other object with a siren in accordance with an embodiment.

As autonomous vehicle 101 navigates or drives on roadways, autonomous vehicle 101 may encounter an emergency vehicle, or a vehicle which has an active siren. The active siren may generally emit a sound or sounds that may be captured, sensed, obtained, or otherwise received by microphone system 326. FIG. 4 shows autonomous vehicle 101 in the vicinity of a vehicle or other object with a siren in accordance with an embodiment. As vehicle drives on a roadway 438a, a siren 442 may be present on a roadway 438b. Microphones (not shown) arranged to capture sounds external to vehicle 101 may pick up signals emitted by or otherwise emanating from siren 442. Depending upon acoustic differences in the signals picked up by each microphone (nor shown), a location of siren 442 relative to vehicle 101 may be substantially ascertained.

Figure 5A:
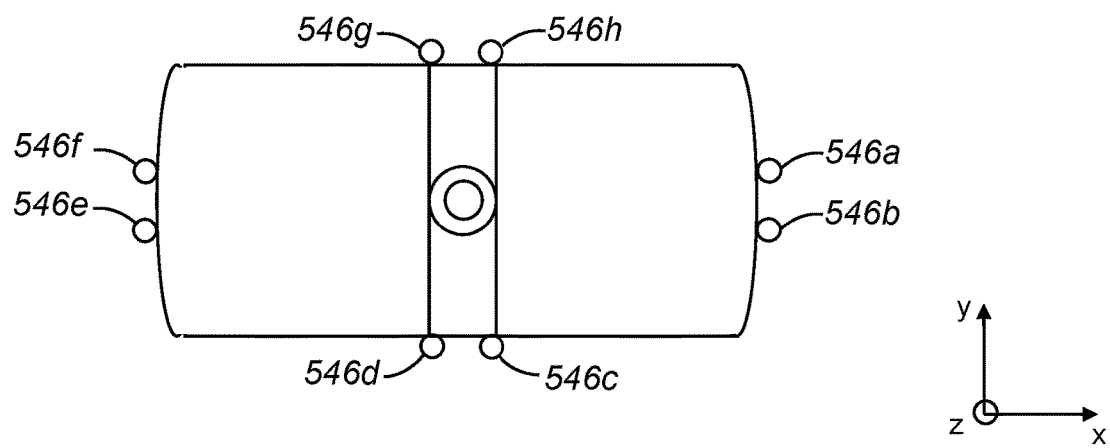
FIG. 5A is a diagrammatic top view representation of an autonomous vehicle, e.g., autonomous vehicle 101 of FIGS. 2 and 3, with a first arrangement of microphones in accordance with an embodiment.

Microphones arranged on an exterior of a vehicle may take on a variety of different configurations. The locations of microphone arrays may vary, and the number of microphones in an array may vary. FIG. 5A is a diagrammatic top view representation of an autonomous vehicle, e.g., autonomous vehicle 101 of FIGS. 2 and 3, with a first configuration of microphones in accordance with an embodiment. Autonomous vehicle 101' includes microphones 546a-h which are arranged in arrays on, or along, the exterior surfaces of vehicle 101'. A first array includes microphones 546a, 546b, and is positioned on a front or leading exterior surface of vehicle 101'. A second array includes microphones 546c, 546d, and is positioned on a right side exterior surface of vehicle 101'. A third array includes microphones 546e, 546f, and is positioned on a back side or rear side exterior surface of vehicle 101'. A fourth array includes microphones 546g, 546h, and is positioned on a left side exterior surface of vehicle 101'.

Adjacent microphones in an array, e.g., microphone 546a and microphone 546b of the first array, may be spaced apart such that a body of vehicle 101' may provide attenuation such that signals captured by adjacent microphones may have different acoustic characteristics. The separation between adjacent microphones in an array may be selected based on wavelengths of sounds to be captured by the adjacent microphones. In general, first array and third array may be used to determine whether sounds are coming from a left side of vehicle 101' or from a right side of vehicle 101', while second array and fourth array may be used to determine whether sounds are coming from a front of vehicle 101' or from a rear of vehicle 101'. It should be appreciated that different microphone arrays may provide a better indication of signal attenuation than different microphones in the same microphone array.

Figure 5B:
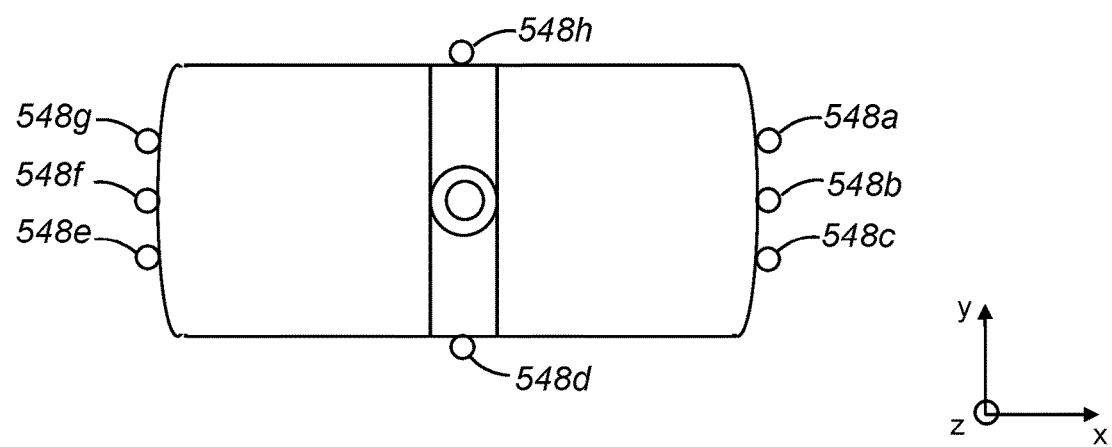
FIG. 5B is a diagrammatic top view representation of an autonomous vehicle, e.g., autonomous vehicle 101 of FIGS. 2 and 3, with a second arrangement of microphones in accordance with an embodiment.

FIG. 5B is a diagrammatic top view representation of an autonomous vehicle, e.g., autonomous vehicle 101 of FIGS. 2 and 3, with a second configuration of microphones in accordance with an embodiment. Autonomous vehicle 101" includes microphones 548a-h which are arranged in arrays on, or along, the exterior surfaces of vehicle 101". A first array includes microphones 548a-c, and is positioned on a front exterior surface of vehicle 101". A second array includes microphone 548d, and is positioned on a right side exterior surface of vehicle 101". A third array includes microphones 546e-g, and is positioned on a back exterior surface of vehicle 101". A fourth array includes microphone 546h, and is positioned on a left side exterior surface of vehicle 101".

First array and third array may be used to determine whether sounds are coming from a left side of vehicle 101" or from a right side of vehicle 101". Second array and fourth array may be used, as for example in conjunction with first array and third array, to determine whether sounds are coming from a front of vehicle 101" or from a rear of vehicle 101". That is, first and third arrays may be used to determine whether sounds are originating from a side of vehicle 101", while second and fourth arrays may be used to determine whether sounds are originating from a front or a rear of vehicle 101".

Figure 6:
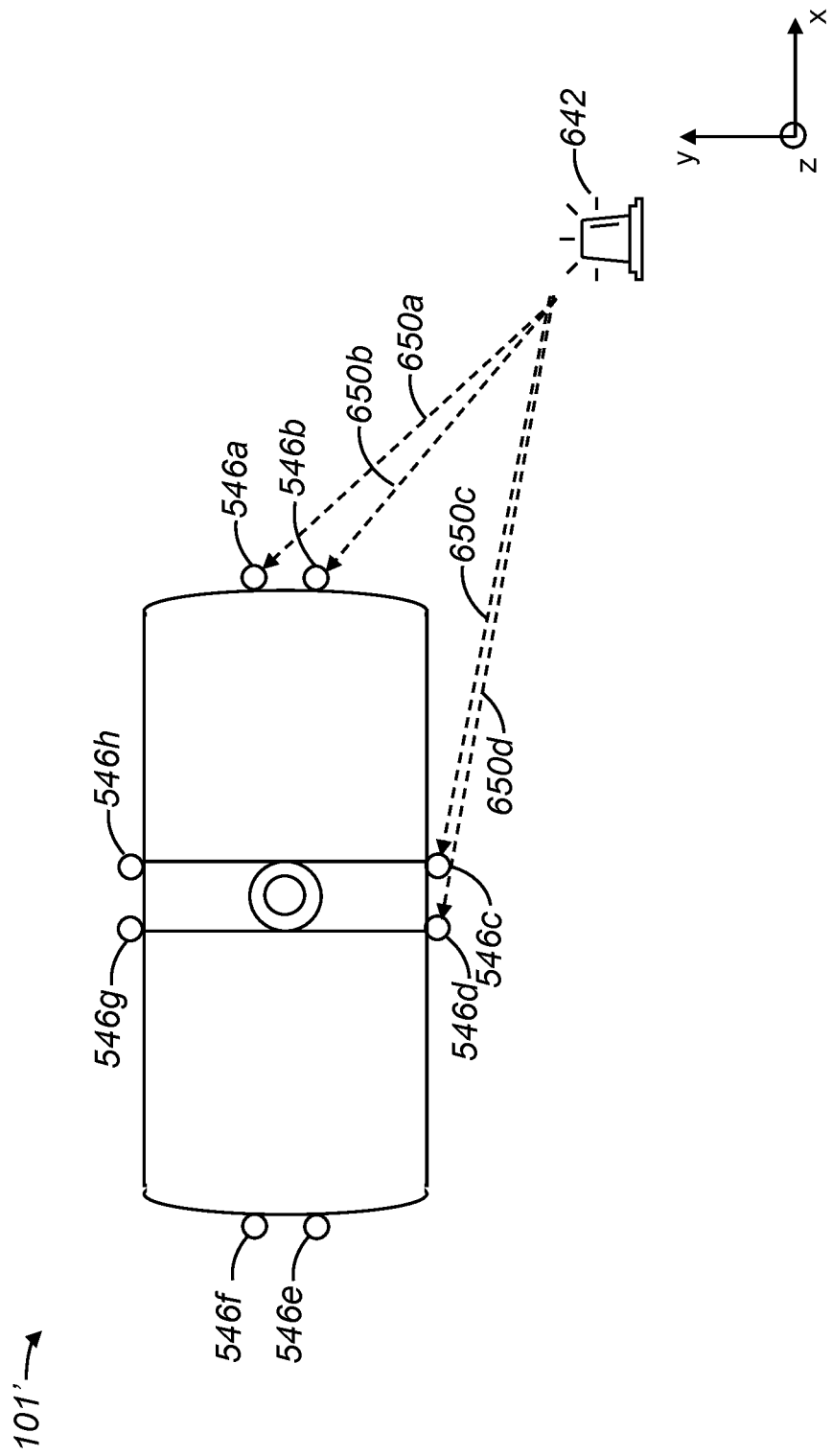
FIG. 6 is a diagrammatic representation of an autonomous vehicle with a first arrangement of microphones, e.g., autonomous vehicle 101' of FIG. 5A, obtaining signals from a siren in accordance with an embodiment.

Signals emitted by or otherwise generated by a sound source such as a siren are captured by microphones on a vehicle, and effectively processed such that a general location of the sound source relative to the vehicle may be ascertained. FIG. 6 is a diagrammatic representation of autonomous vehicle 101' of FIG. 5A capturing signals from a siren in accordance with an embodiment. As shown, autonomous vehicle 101' is in a vicinity of a siren 642. That is, autonomous vehicle 101' is within a range of siren 642 such that at least some of microphones 546a-h mounted on autonomous vehicle 101' may capture sound signals emanating from, or originating from, siren 642.

A sound signal 650a is received by microphone 546a of a first array, and a sound signal 650b is received by microphone 546b of the first array. In one embodiment, sound signals 650a, 650b may be received or captured at approximately the same time. Acoustic characteristics of sound signal 650b may be stronger than acoustic characteristics of sound signal 650a, e.g., the intensity of sound signal 650b as captured by microphone 546b may be stronger than the intensity of sound signal 650a as captured by microphone 546a. As such, a location of siren 642 may be determined to be closer to microphone 546b than to microphone 546a. Thus, siren 642 may be ascertained to be to the right side of vehicle 101'.

Microphones 546c, 546b are part of a second array, and a signal 650c may be captured by microphone 546c at substantially the same time as a signal 650d may be captured by microphone 546d. Acoustic characteristics of signals 650c, 650d as captured by microphones 546c, 546d, respectively, may indicate that signal 650c is acoustically stronger than signal 650d. Hence, a distance between microphone 564c and siren 642 may be determined to be less than a distance between microphone 564d and siren 642. As a result, siren 642 may be determined to be located in front of vehicle 101'

The first array and the second array of microphones effectively cooperate to determine that a general location of siren 642 is in front of vehicle 101', and to the right of vehicle 101'. That is, the first array and the second array of microphones my determine that sound obtained by the first array and the second array of microphones originates from the front and from the right of vehicle 101".

Figure 7:
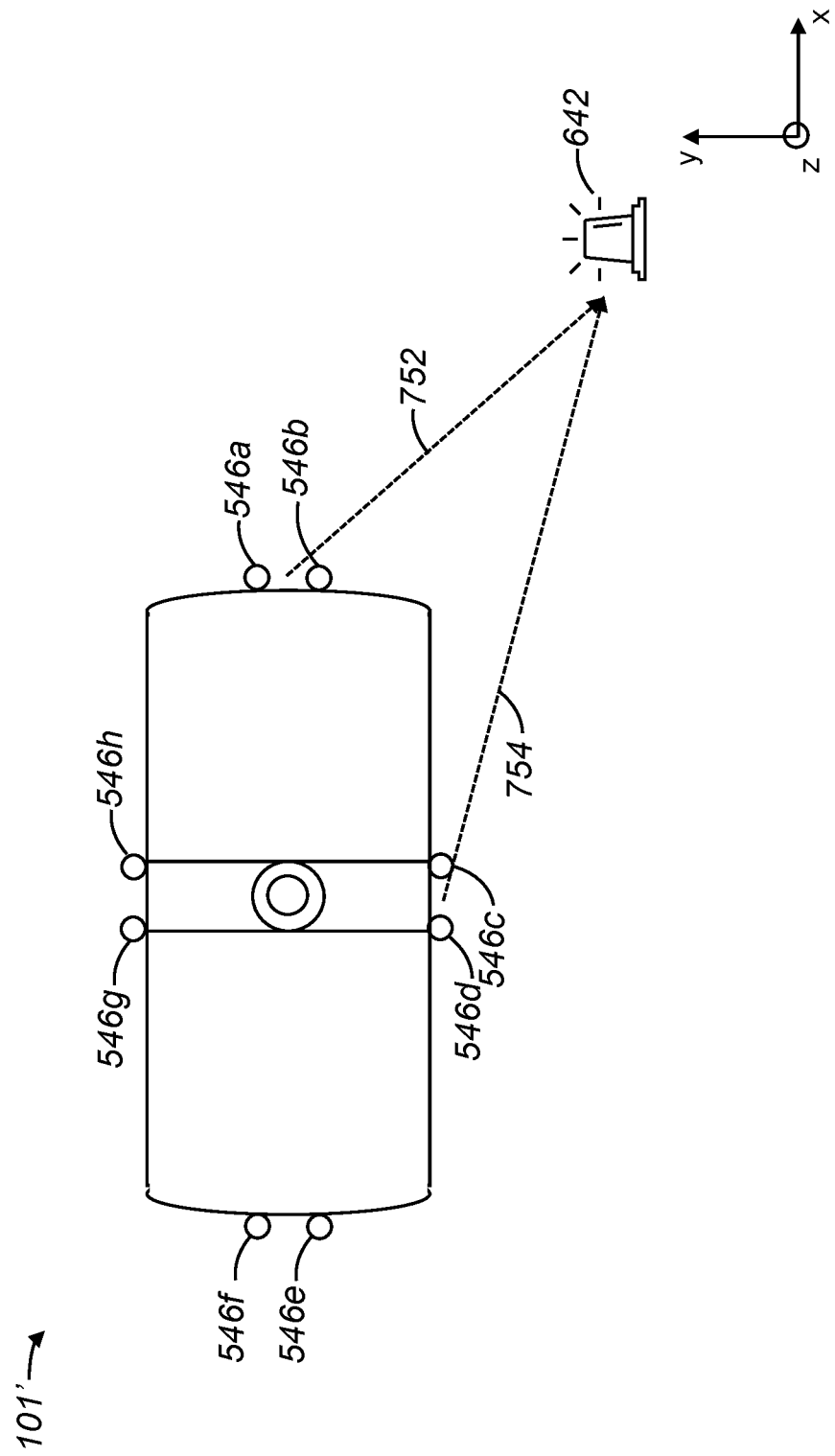
FIG. 7 is a diagrammatic representation of an autonomous vehicle with a first arrangement of microphones, e.g., autonomous vehicle 101' of FIGS. 5A and 6, which may utilize triangulation to determine a location of a siren, e.g., siren 642 of FIG. 6, in accordance with an embodiment.

In one embodiment, signals 650a-d may essentially be triangulated to further narrow down a general location of siren 642. FIG. 7 is a diagrammatic representation of an autonomous vehicle 101' which may utilize triangulation to determine a location of siren 642 in accordance with an embodiment. Based on signals 650a-d, as shown in FIG. 6, triangulation techniques may be used to effectively generate vectors 752, 754 which indicate a position of siren 642.

Figure 8:
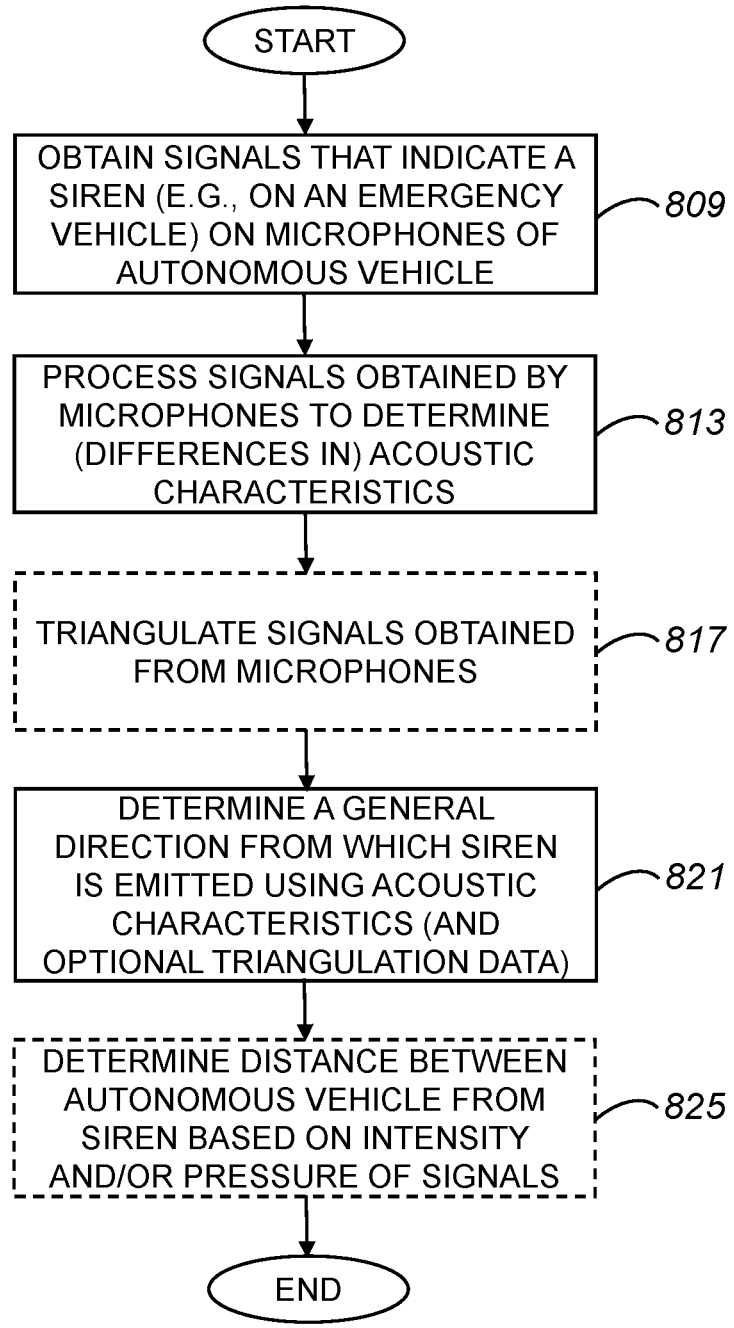
FIG. 8 is a process flow diagram which illustrates a method of using microphone arrays to determine a location of a vehicle with a siren in accordance with an embodiment.

FIG. 8 is a process flow diagram which illustrates a method of using microphone arrays to determine a location of a vehicle with a siren in accordance with an embodiment. A method 805 of using microphone arrays to substantially identify a location of an emergency vehicle begins at a step 809 in which signals that indicate the existence of a siren in the vicinity of an autonomous vehicle are captured or otherwise obtained by microphones on the autonomous vehicle. The microphones may be arranged as arrays of microphones, as discussed above. In one embodiment, microphone arrays may be positioned on a front of the autonomous vehicle, on the sides of the autonomous vehicle, and/or on the back of the autonomous vehicle.

It should be appreciated that a determination that signals obtained by microphone arrays are from a siren may be made using any suitable method. For example, a signal may be identified as originating from a siren based on a frequency of the signal. A siren on an emergency vehicle generally produces sound in a frequency range of between approximately 500 Hertz (Hz) and approximately 3000 Hz. In addition to, or in lieu of, identifying a signal as originating from a siren based on a signal frequency, identifying a signal may include, but is not limited to including, determining a waveform associated with the signal.

In a step 813, the signals obtained by the microphones is processed to determine acoustic characteristics. That is, signals received by microphones are processed to determine acoustic characteristics, as well as differences in acoustic characteristics, of the signals. In general, each microphone may have a signal with different acoustic characteristics, e.g., different intensities. The processing of signals captured by microphones will be discussed in more detail below with respect to FIG. 9. It should be appreciated that each signal may be associated with a length of time. That is, a captured signal may be a signal captured over a predetermined amount of time.

After acoustic characteristics of signals is determined, process flow moves from step 813 to a step 817 in which the signals obtained by the microphones are effectively triangulated. Triangulating the signals provides an additional assessment of a location of a siren.

Once signals are processed and optionally triangulated, a general direction from which the signals were captured is identified in a step 821 using the acoustic characteristics of the signals and, optionally, triangulation data. Acoustic characteristics may enable a determination to be made as to whether a siren is in front of the autonomous vehicle, to the left of the autonomous vehicle, to the right of the autonomous vehicle, and/or behind the autonomous vehicle. For example, with reference to FIG. 6, when the acoustic characteristics of signal 650b are determined to be stronger than the acoustic characteristics of signal 650a, the indication is that siren 642 is to the right of vehicle 101' or in an area near the right side of vehicle 101', and when the acoustic characteristics of signal 650c are determined to be stronger than the acoustic characteristics of signal 650d, the indication is that siren 642 is in front of vehicle 101' or in an area near the front of vehicle 101'.

In an optional step 825, an actual distance between the autonomous vehicle and the siren may be determined based on the sound intensity or sound pressure associated with the captured signals. That is, the actual location of the siren relative to the autonomous vehicle may substantially be pinpointed using intensity and/or pressure information. Once the general direction from which a siren is emitted, and/or after a distance between the autonomous vehicle and the siren is optionally determined, the method of using microphone arrays to substantially identify a location of an emergency vehicle is completed.

Figure 9:
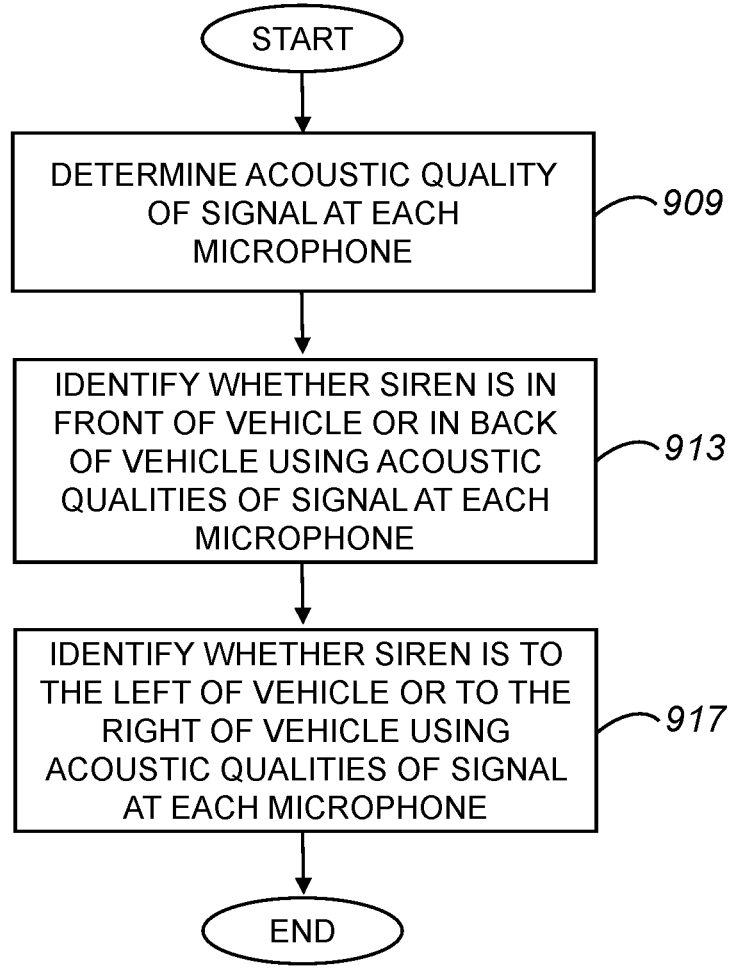
FIG. 9 is a process flow diagram which illustrates a method of processing signals obtained by microphones, e.g., step 813 of FIG. 8, in accordance with an embodiment.

With reference to FIG. 9, a method of processing signals obtained by microphones, e.g., step 813 of FIG. 8, will be described in accordance with an embodiment. A method 813 of processing signals obtained by microphones to determine acoustic characteristics of the signal begins at a step 909 in which the acoustic quality of a captured or received signal is determined for each microphone. The audio signals received by a microphone may be measured in voltage or in decibels relative to voltage. As will be appreciated by those skilled in the art, the acoustic quality of a microphone may be associated with an intensity measured as watts per distance squared, e.g., watts per square meter. Determining the acoustic characteristics of the signal may generally include, but is not limited to including, determining the loudness or decibel level associated with signals obtained by each microphone. One method of determining the acoustic quality of a received signal at each microphone will be discussed below with reference to FIG. 12.

Using the determined acoustic characteristics, it is identified in step 913 whether the siren is located somewhere in front of the vehicle or is located somewhere in back of, or to the rear of, the vehicle. For example, if a signal obtained by a front microphone of an array of microphones mounted on a side of the vehicle captures a signal with stronger acoustic characteristics than for a signal obtained by a rear microphone of the array of microphones mounted on the side of the vehicle, the siren may be determined to be located somewhere in front of the vehicle or in a vicinity near the front of the vehicle. A stronger acoustic characteristic may be indicated by, but is not limited to being indicated by, a higher sound intensity or decibel level.

In a step 917, an identification is made as to whether the siren is physically located somewhere to the left of the vehicle or physically located somewhere to the right of the vehicle using the acoustic qualities of signals obtained by each microphone mounted on the vehicle. For example, if a signal obtained by a left microphone of an array of microphones mounted on a front of the vehicle captures a signal with stronger acoustic characteristics than for a signal obtained by a right microphone of the array of microphones mounted on the front of the vehicle, the siren may be determined to be located somewhere to the left of the vehicle, e.g., towards the left or along the left of the vehicle. After it is identified whether the siren is to the left of the vehicle or to the right of the vehicle, the method of processing signals is completed.

Figure 10:
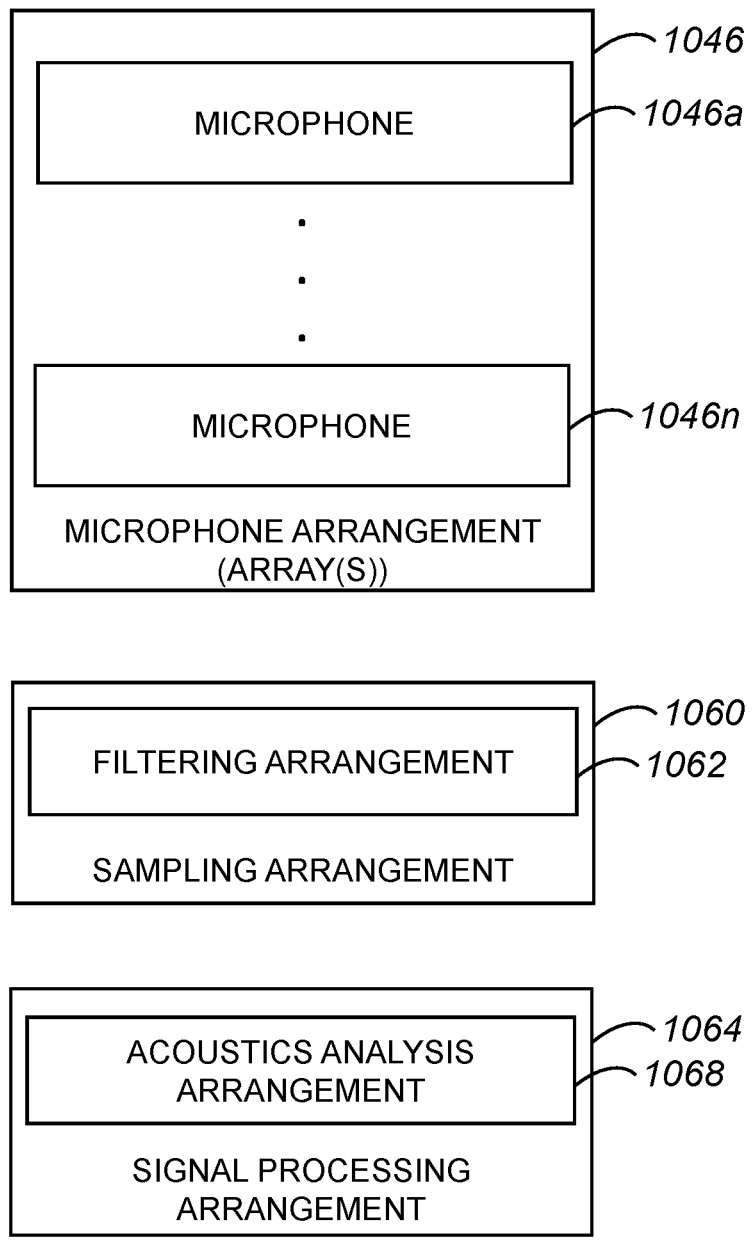
FIG. 10 is a block diagram representation of a microphone system, e.g., microphone system 326 of FIG. 3, in accordance with an embodiment.

Microphones mounted on an exterior of an autonomous vehicle are generally part of a microphone system of the autonomous vehicle. FIG. 10 is a block diagram representation of a microphone system, e.g., microphone system 326 of FIG. 3, in accordance with an embodiment. Microphone system 326 includes a microphone arrangement 1046, a sampling arrangement 1060, and a signal processing arrangement 1064.

Microphone arrangement 1046 includes microphones 1046a-n which may be arranged in arrays. The arrays may each include one or more microphones 1046a-n. As discussed above with respect to FIGS. 5A and 5B, microphone arrays may be positioned on the front of a vehicle, on the sides of the vehicle, and on the back of a vehicle. The number of microphones 1046a-n may vary. In one embodiment, eight microphones 1046a-n may be included in microphone arrangement 1046. However, it should be understood that microphone arrangement 1046 may generally include fewer than or more than eight microphones 1046a-n.

Microphones 1046a-n may be any suitable type of microphone including, but not limited to including, wireless microphones, wired microphones, condenser microphones, fiber-optic microphones, piezoelectric or crystal microphones, ribbon microphones, dynamic or moving-coil microphones, and/or micro electrical-mechanical system (MEMS) microphones. Microphones 1046a-n may be mounted externally on a vehicle, e.g., vehicle 101 of FIGS. 2 and 3, using any suitable methods. In one embodiment, microphones 1046a-n may be mounted such that portions of microphones 1046a-n are substantially internal to a vehicle, while portions protrude out of the vehicle or are otherwise effectively exposed to the external environment around the vehicle.

Signals captured by microphone arrangement 1046 are sampled by, or otherwise obtained by, sampling arrangement 1062. Sampling arrangement 1062 may generally sample portions of signals, i.e., sound waves, and may effectively covert the signals into data which may be used by filtering arrangement 1062 to essentially determine whether captured signals are likely to be signals from a siren. Filtering arrangement 1062 may, for example, be configured to identify signals within a particular frequency range as being associated with a siren on an emergency vehicle.

Signal processing arrangement 1064 may process signals which have been sampled by sampling arrangement 1062, and may identify acoustic characteristics of the signals. In one embodiment, an acoustics analysis arrangement 1068 may process the signals to determine characteristics such as intensities of the signals, and may use the characteristics to substantially determine, based on which microphone 1046a-n is associated with which intensities, a general direction from which the signals came. That is, acoustics analysis arrangement 1068 may effectively identify a general location of a source or origin of signals received by microphone arrangement 1046.

Figure 11:
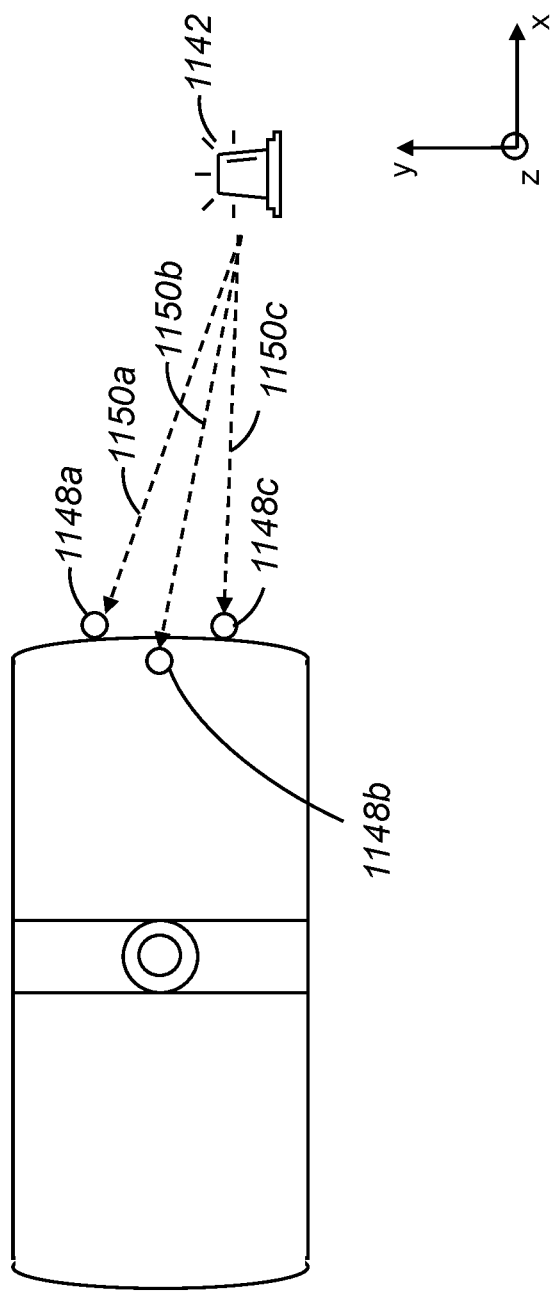
FIG. 11 is a diagrammatic representation of an autonomous vehicle with an offset microphone array that may be used to identify a location of a siren in accordance with an embodiment.

FIG. 11 is a diagrammatic representation of an autonomous vehicle with an offset microphone array that may be used to identify a location of a siren in accordance with an embodiment. A vehicle 1101 includes an array of microphones 1148a-c mounted on a front exterior surface of vehicle 1101. Although microphones 1148a-c are shown as mounted on the front of vehicle 1101, it should be appreciated that microphones 1148a-c are not limited to being mounted on the front of vehicle 1101.

Microphones 1148a-c are mounted such that microphone 1148b is substantially offset from microphones 1148a, 1148c relative to an x-axis. The use of offset microphones 1148a-c allows for time delays associated with the receipt of signals 1150a-c from a siren 1142 to used to further identify a location of siren 1142. For example, signal 1150c may be captured by microphone 1148c at a time t1, signal 1150a may be captured by microphone 1148a at a time t2, and signal 1150b may be captured by microphone 1148b at a time t3. As a result of the time delays of when signals 1150a-c are captured, the general direction from which signals 1150a-c are emitted may be determined.

In one embodiment, time delay information may be used in conjunction with methods described above to determine a location of siren 1142. That is, time delay information may be used in addition to acoustic information to identify a direction from which a signal is received.

Figure 12:
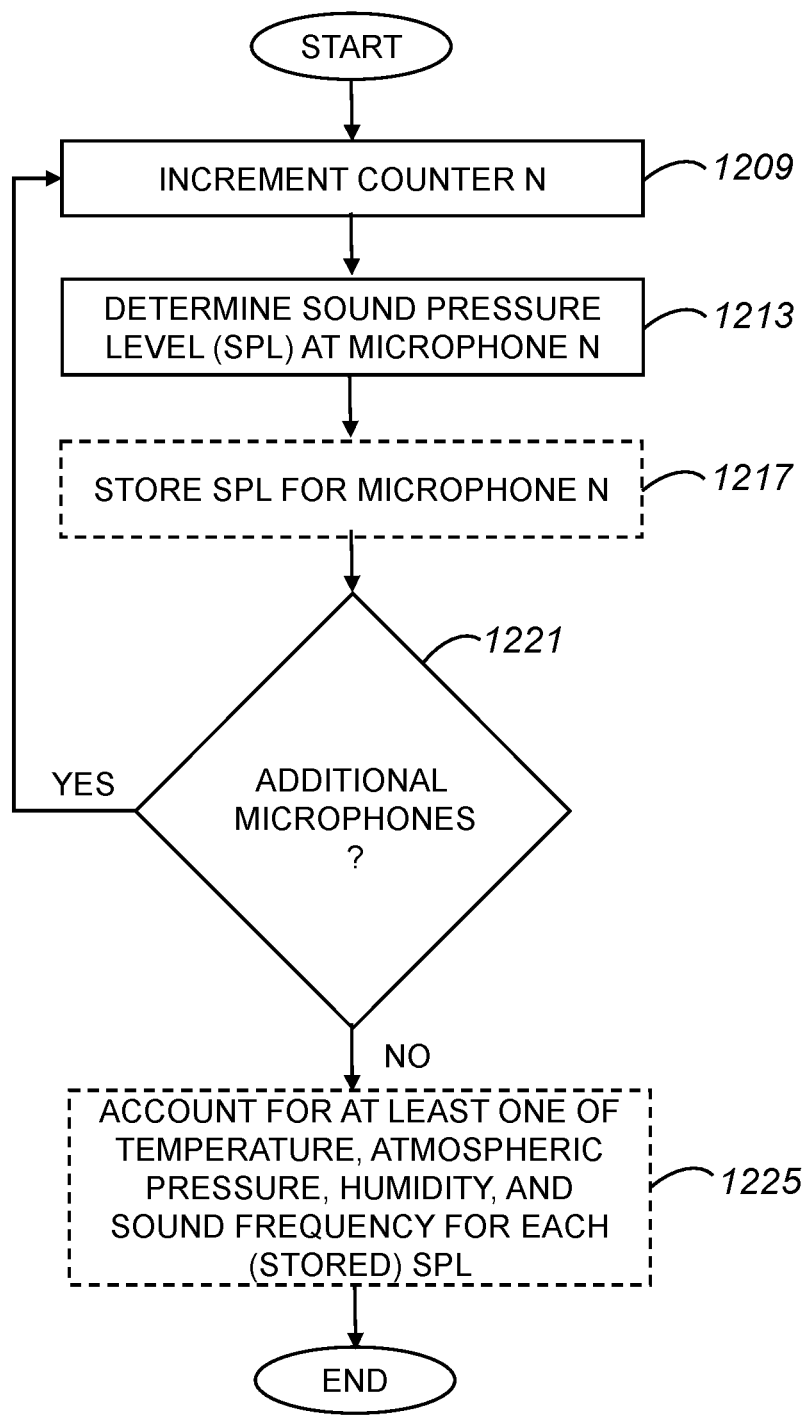
FIG. 12 is a process flow diagram which illustrates a method of, determining an acoustic quality of a signal obtained at each microphone of a vehicle e.g., step 909 of FIG. 9, in accordance with an embodiment.

As mentioned above with respect to FIG. 9, the acoustic quality for received signals may be determined with respect to each microphone on a vehicle which receives a signal, as for example a signal associated with a particular siren or sound source. FIG. 12 is a process flow diagram which illustrates a method of, determining an acoustic quality of a signal obtained at each microphone of a vehicle e.g., step 909 of FIG. 9, in accordance with an embodiment. A method 909 of determining acoustic qualities associated with signals captured on microphones mounted on or in a vehicle begins at a step 1209 in which a counter N is incremented, e.g., from zero to one. Once the counter is incremented, the sound pressure level (SPL) associated with a sound signal obtained by microphone N is determined in a step 1213. As will be appreciated by those skilled in the art, a sound amplitude or a SPL generally determines the loudness of a sound. SPL may be measured in units of pressure, e.g., in Pascals. Microphone N may effectively measure a voltage that may be converted to a pressure. By way of example, microphone N may determine a voltage associated with a received sound signal, and convert the voltage into a SPL for microphone N.

In a step 1217, the SPL for microphone N is optionally stored, e.g., in a data store on or associated with the vehicle. A determination is made in a step 1221 as to whether there are additional microphones for which a SPL is to effectively be calculated. If the determination is that there are additional microphones for which a SPL is to be identified, process flow returns to step 1209 in which counter N is incremented.

Alternatively, if it is determined that there are no additional microphones for which a SPL is to be determined, the process flow proceeds to an optional step 1225 in which factors which may affect the SPL determined for the sound signal obtained by each microphone may be accounted for. By way of example, factor including, but not limited to including, a temperature, an atmospheric pressure, a humidity, and/or a sound frequency may be accounted for with respect to each SPL. After SPLs for each microphone are determined, and optionally after factors are accounted for, the method of determining acoustic qualities associated with signals capture on microphones mounted on or in a vehicle is completed.

Figure 13:
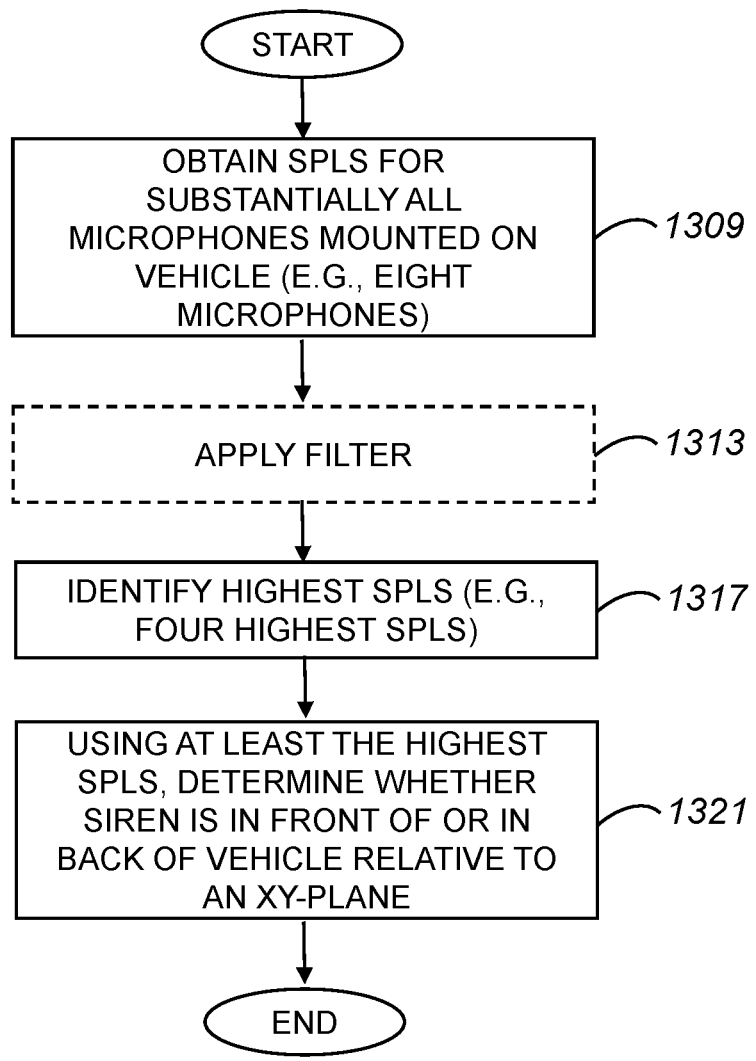
FIG. 13 is a process flow diagram which illustrates a method of identifying whether a siren sound is emanating from a direction in front of a vehicle or a direction in back of the vehicle, e.g., step 913 of FIG. 9, in accordance with an embodiment.

Using SPLs of each microphone mounted on or in a vehicle, it may be substantially determined where a siren or source of sound is relative to the vehicle. That is, the SPLs of the microphones that relate to a particular siren or source of sound may be used to determine generally which direction the siren or source of sound is emanating from relative to a location of the vehicle. FIG. 13 is a process flow diagram which illustrates a method of identifying whether a siren sound is emanating from a direction in front of a vehicle or a direction in back of the vehicle, e.g., step 913 of FIG. 9, in accordance with an embodiment. A method 913 of identifying whether a siren sound or other sound is emanating from a direction in front of a vehicle or a direction in back of the vehicle begins at a step 1309 in which SPLs associated with signals received on the microphones of a vehicle are obtained. In one embodiment, a vehicle may have approximately eight microphones, with two microphones mounted on a front side of the vehicle, two microphones mounted on a back of the vehicle, and two microphones mounted on either side of the vehicle. It should be appreciated, however, that the number of microphones mounted on a vehicle may vary widely.

In an optional step 1313, a filter may be applied to the SPLs. The filter may effectively filter out noise on the SPLs that may be associated with sounds associated with the vehicle itself, sounds associated with other vehicles or traffic participants in the environment around the vehicle, electrical noise, noise associated with wind, and/or noise associated with weather.

From step 1309, or from optional step 1313, the highest SPLs associated with the microphones on a vehicle may be identified. In one embodiment, the four microphones with the highest SPLs may be identified. After the microphones with the highest SPLs are identified, the SPLs may be used to determine whether the siren or sound source is in front of the vehicle with respect to a horizontal plane, e.g., an xy-plane, or in back of the vehicle with respect to the horizontal plane in a step 1321. The method of identifying whether a siren sound or other sound is emanating from a direction in front of a vehicle or a direction in back of the vehicle is then completed.

Figure 14:
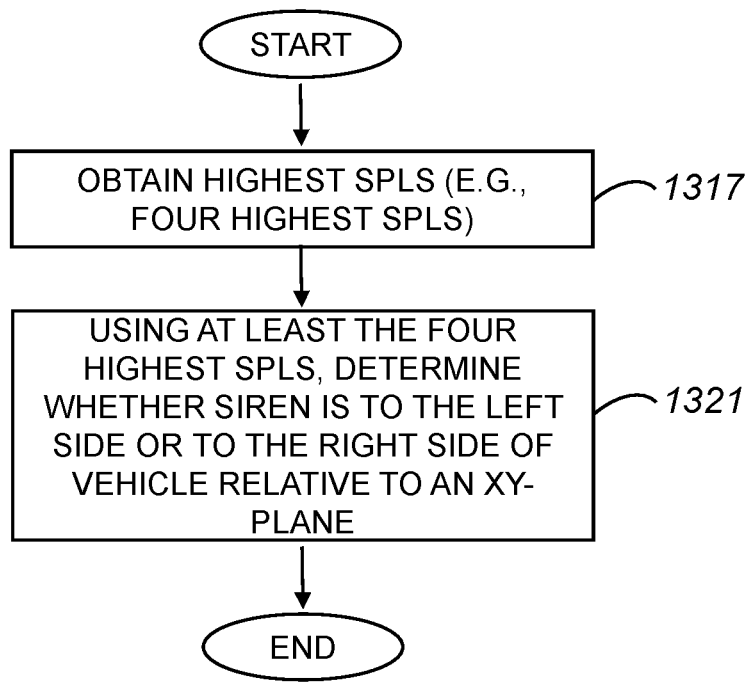
FIG. 14 is a process flow diagram which illustrates a method of identifying whether a siren sound is emanating from a direction to the left of a vehicle or to the right of the vehicle, e.g., step 917 of FIG. 9, in accordance with an embodiment.

FIG. 14 is a process flow diagram which illustrates a method of identifying whether a siren sound is emanating from a direction to the left of a vehicle or to the right of the vehicle, e.g., step 917 of FIG. 9, in accordance with an embodiment. The method 917 of identifying whether a siren sound or other sound is emanating from a direction to the left of a vehicle or a direction to the right of the vehicle begins at a step 1317 in which the highest SPLs associated with a signal received by microphones on a vehicle are obtained. Once obtained, the highest SPLs, as for example the four highest SPLs associated with approximately eight microphones of a vehicle, are processed in a step 1321 to determine which side of the vehicle the siren or sound source is on in a vertical plane or an xy-plane. The method of identifying whether a siren sound or other sound is emanating from a direction to the left of a vehicle or a direction to the right of the vehicle is then completed.

In one embodiment, microphones on a vehicle may be used to detect movement of a siren or other sound source. That is, microphones on a vehicle may be used to essentially determine whether a sound source is moving towards the vehicle or away from the vehicle. Such a determination may involve, but is not limited to involving, determining angles from which the sound is received by the microphones at different times and/or determining the SPLs of each microphone at different times.

Figure 15:
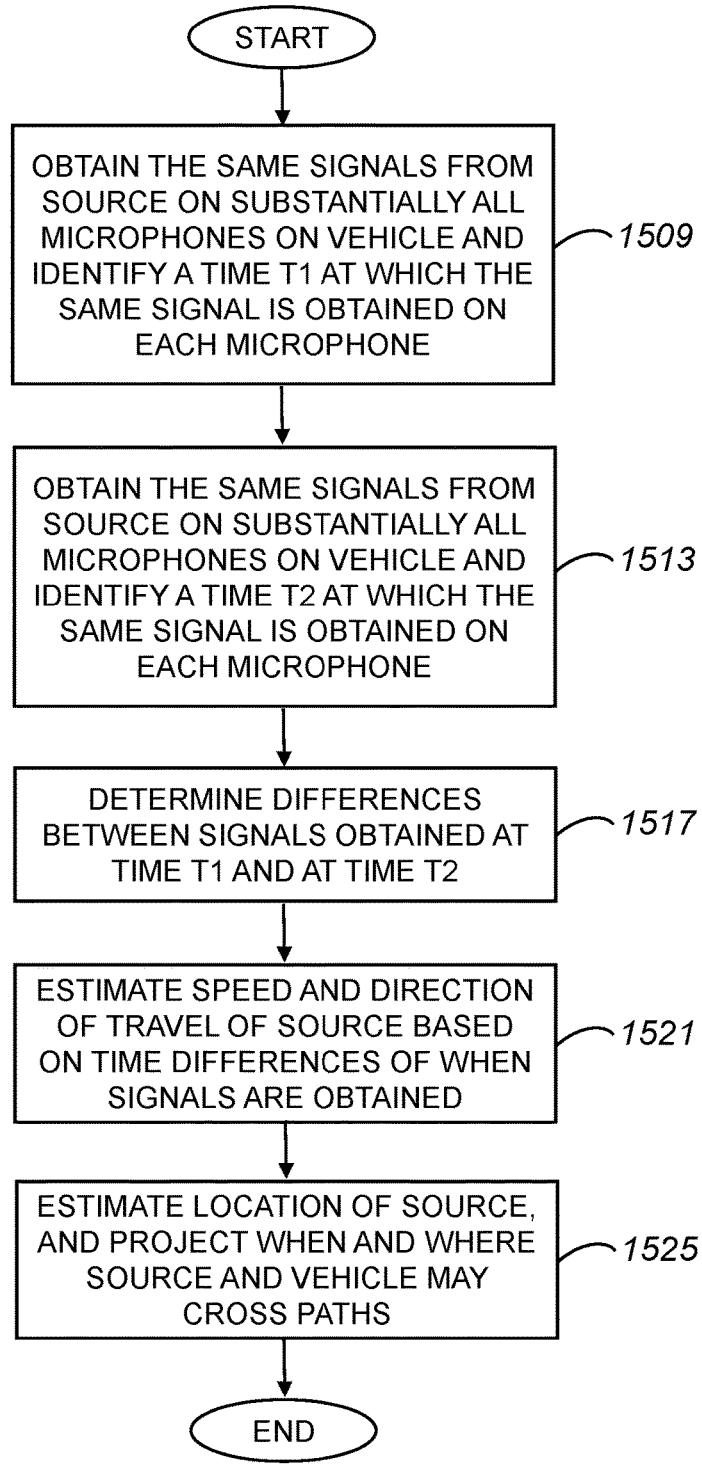
FIG. 15 is a process flow diagram which illustrates a first method of determining when a source of sound such as a siren may reach a vehicle in accordance with an embodiment.

FIG. 15 is a process flow diagram which illustrates a first method of determining when a source of a siren may reach a vehicle in accordance with an embodiment. A first method for determining when a source of sound such as a siren may reach a vehicle begins at a step 1509 in which substantially the same signals from a source of a sound, e.g., a siren, is obtained on substantially all microphones mounted on a vehicle such as an autonomous vehicle. A time T1 at which the same signal is obtained on each microphone, e.g., the SPL at a time T1 of a signal at each microphone, may be obtained.

In a step 1513, the same signals may be obtained from the source at a time T2. Once signals are obtained on substantially all microphones that correspond to times T1 and T2, differences between the signals obtained at times T1 and T2 are determined in a step 1513. An acoustic signal arrives at different microphones at different times T1 and T2 due to different distances between the microphones and the source of the signal. Differences may be evaluated and estimated by comparing SPLs for signals obtained on a particular microphone at a time T1 and a time T2 and/or by comparing SPLs across substantially all microphones at a time T1 and a time T2. An estimated time difference may enable an angle of arrival for a signal to be estimated.

Using the differences determined in step 1517, as well as SPLs associated with each signal obtained by microphones, an approximate speed and/or approximate direction of travel of the source may be estimated in a step 1521. Suitable methods used to determine an approximate speed and/or an approximate direction of travel of the source may vary widely. For example, comparing the relative SPLs at each microphone at different times, and evaluating the actual values of the SPLs, may enable a determination to be made as to an approximate velocity of the source and/or a direction in which the source may be travelling relative to the vehicle. That is, an approximate velocity and/or an angle from which the source is either approaching the vehicle or moving away from the vehicle may be determined or otherwise approximated. Using information relating to an approximate velocity and/or direction, an estimate may be made in a step 1525 as to where the source is relative to the vehicle. Further, given a speed and a direction at which the vehicle is travelling, a time at which the source and the vehicle may cross paths may be projected and/or otherwise estimated, and the method of determining when a source of sound such as a siren may reach a vehicle. It should be appreciated that when the source is essentially moving away from the vehicle, a projection of when the source and the vehicle may cross paths may result in an indication that the source and the vehicle are not expected to cross paths.

Figure 16:
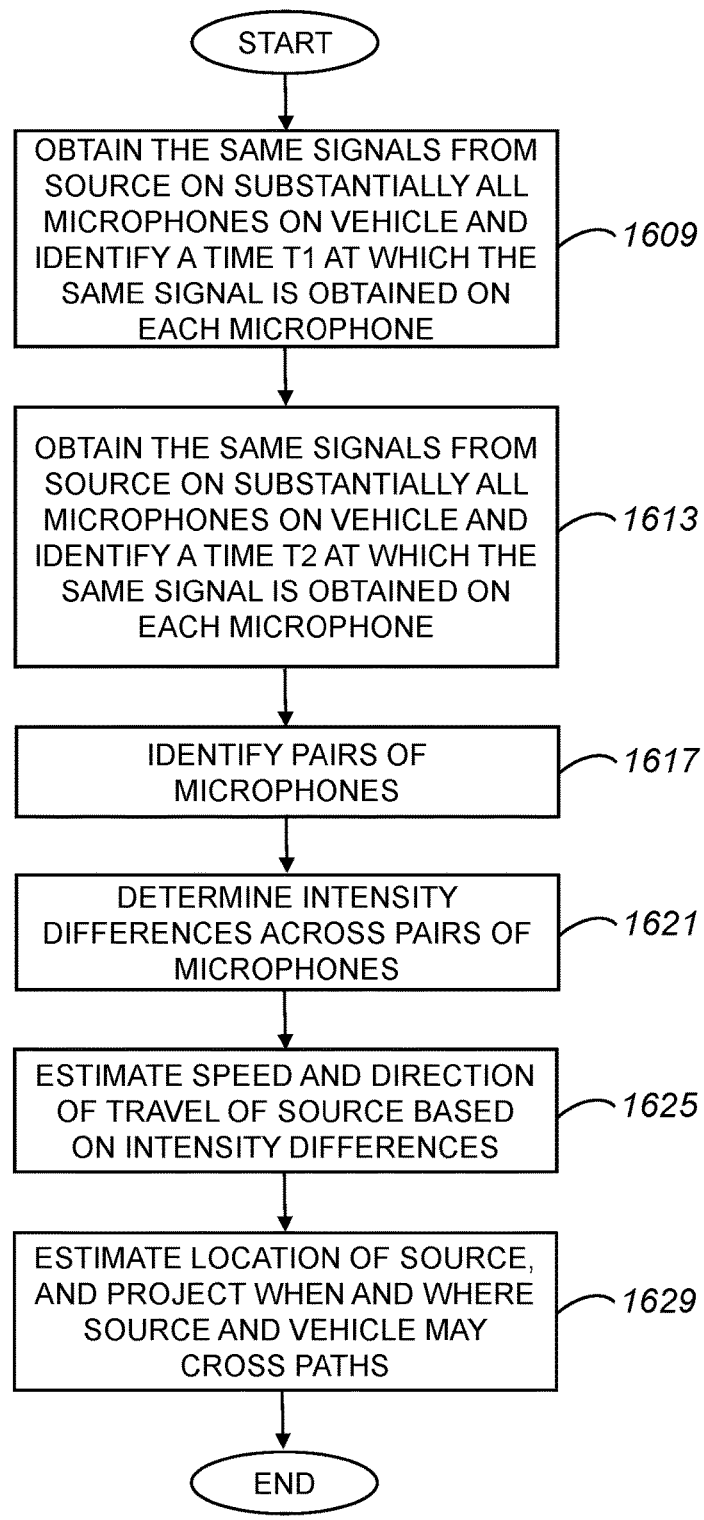
FIG. 16 is a process flow diagram which illustrates a second method of determining when a source of a sound such as a siren may reach a vehicle in accordance with an embodiment.

FIG. 16 is a process flow diagram which illustrates a second method of determining when a source of sound such a siren may reach a vehicle in accordance with an embodiment. A second method for determining when a source of sound such as a siren may reach a vehicle begins at a step 1609 in which substantially the same signals from a source of a sound, e.g., a siren, is obtained on substantially all microphones mounted on a vehicle such as an autonomous vehicle. A time T1 at which the same signal is obtained on each microphone, e.g., the SPL at a time T1 of a signal at each microphone, may be obtained. In one embodiment, for every pair of microphones, a time T1 may be a time a signal arrives at a first microphone, while a time T2 may be a time at which the signal arrives at a second microphone.

In a step 1613, the same signals may be obtained from the source at a time T2. Once signals are obtained on substantially all microphones that correspond to times T1 and T2, pairs of microphones are identified in a step 1617. Identifying pairs of microphones may include, but is not limited to including, identifying which microphones in an array of microphones are positioned substantially together and/or identifying which microphones are positioned on the same side of the vehicle. For example, microphones that are substantially adjacent to each other on a side of the vehicle may be identified as a pair of microphones. In one embodiment, a vehicle may include approximately four pairs of microphones, although it should be appreciated that the number of pairs of microphones may vary widely. Further, in lieu of pairs of microphones, sets of more than two microphones may instead be included on a vehicle.

From step 1617, process flow moves to a step 1621 in which intensity differences across each identified pair of microphones is determined at times T1 and T2. In general, the sound or acoustic intensity associated with a signal received at a first microphone of a pair at a time T1 may differ from the intensity associated with the signal received at a second microphone of the pair at a time T1. For example, if the first microphone is physically closer to the source than the second microphone, the intensity associated with the signal received at the first microphone may be higher than the intensity associated with the signal received at the second microphone.

After intensity differences are determined across pairs of microphone arrays, as for example at times T1 and T2, the speed and/or direction of travel of the source may be estimated in a step 1625 based at least in part on the intensity differences. As a distance may be estimated based on intensity, for a particular microphone, by comparing sound intensity at times T1 and T2, the distance between the source and the vehicle may be substantially estimated. Once the speed and/or direction of travel are estimated, an estimate may be made in a step 1629 as to where the source is relative to the vehicle. Additionally, given a speed and a direction at which the vehicle is travelling, a time at which the source and the vehicle may cross paths may be projected and/or otherwise estimated, and the method of determining when a source of sound such as a siren may reach a vehicle.

Figure 17:
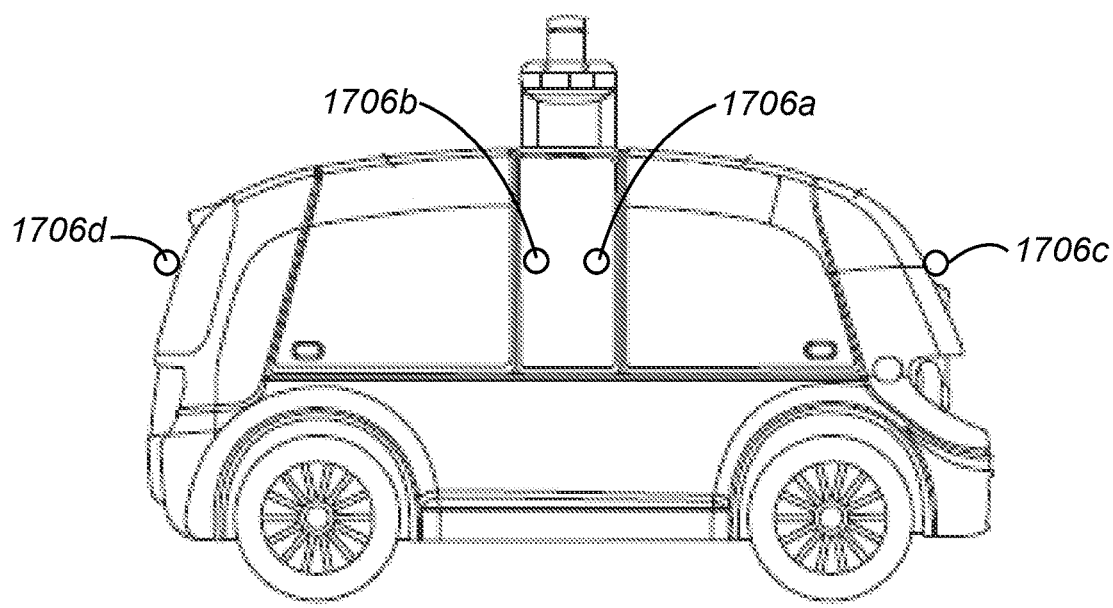
FIG. 17 is a diagrammatic representation of an autonomous vehicle which a plurality of microphones aligned along a horizontal axis in accordance with an embodiment.
Figure 17:
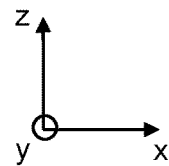

Microphones mounted or otherwise positioned on external surfaces of a vehicle may generally be aligned in an xy-plane, or a horizontal plane, such that substantially all microphones are substantially aligned along a horizontal axis, e.g., at approximately a same height, with respect to a body of the vehicle. FIG. 17 is a diagrammatic representation of an autonomous vehicle which a plurality of microphones aligned along a horizontal axis in accordance with an embodiment. An autonomous vehicle 1701 is configured to have a plurality of microphones 1706a-d mounted on one or more exterior surfaces of vehicle 1701. As shown, microphones 1706a, 1706b are mounted on a side of vehicle 1701, while at least one microphone 1706*c* is mounted on a front surface of vehicle 1701 and at least one microphone 1706*d* is mounted on a rear surface of vehicle 1701. In one embodiment, microphones 1706*a*, 1706*b* may be mounted on a right side of vehicle 1701, two microphones including microphone 1706*c* may be mounted on a front surface of vehicle 1701, two microphones including microphone 1706*d* may be mounted on a rear surface of vehicle 1701, and two microphones (not shown) may be mounted on a left side of vehicle 1701.

In the described embodiment, microphones 1706*a-d* are positioned on vehicle 1701 such that microphones 1706*a-d* are substantially all in the same xy-plane. That is, microphones 1706*a-d* are located on vehicle 1701 at approximately the same height relative to a vertical axis, or a z-axis. It should be appreciated that the positions of microphones 1706*a-d* may generally vary with respect to a location relative to an x-axis and/or a y-axis. By way of example, the locations of microphones 1706*a-d* relative to an x-axis and/or a y-axis may vary based upon requirements of vehicle 1701 and/or sources of noise associated with vehicle 1701.

Although only a few embodiments have been described in this disclosure, it should be understood that the disclosure may be embodied in many other specific forms without departing from the spirit or the scope of the present disclosure. By way of example, a number of microphones included in each array of microphones mounted on an exterior surface of an autonomous vehicle may vary. Further, the spacing between adjacent microphones in an array may vary. In general, the spacing or separation between adjacent microphones may be selected to enable a body of vehicle to provide at least a threshold amount of signal attenuation.

Microphone arrays have generally been described as being positioned on a front exterior surface, side exterior surfaces, and a back exterior surface of a vehicle. It should be understood that microphone arrays are not limited to being positioned on front, side, and back surfaces of a vehicle. For example, microphone arrays may be positioned on corners, a top surface, and/or a bottom surface of a vehicle. In addition, the number of microphone arrays mounted on or otherwise positioned on a vehicle may vary.

Microphones have been described as being mounted on an external surface of a vehicle. Microphones may be mounted in recesses on an external surface, or microphones may be mounted partially inside a vehicle such that portions of microphones are exposed to the environment around the vehicle. In one embodiment, microphones may be substantially attached to an exterior surface of a vehicle. In some instances, microphones attached to an exterior surface of a vehicle may be attached by a mechanical structure such as an arm which effectively holds portions of microphones, e.g., transducer portions, away from the exterior surface.

In one embodiment, when a siren emits sound signals that include tonal changes, a microphone system may account for the changes in tones when determining an acoustic quality of each signal. By way of example, a microphone system may analyze changes in tones along when determining an intensity of a signal.

Sirens have been described as being associated with emergency vehicles. The detection of sounds associated with an emergency vehicle is not limited to detecting sounds emanating from a siren. For instance, some emergency vehicles such as police vehicles may utilize speakers to catch the attention of drivers. The microphone arrays as discussed above may be used to determine acoustic qualities associated with sounds coming from speakers as well as other audible warning systems.

The detection of sounds or sound signals is not limited to being used to identify sirens or other sounds associated with emergency vehicles. That is, sounds that are not associated with emergency vehicles may be detected by a vehicle with microphones mounted thereon. A vehicle with microphones mounted thereon may, upon detecting sounds, take an appropriate actions such as coming to a stop and/or pulling over to the side of a road. Other sounds which may be detected and identified include, but are not limited to including, sounds from vehicle horns and/or sounds from speakers mounted on vehicles.

While a microphone array has been discussed as being arranged substantially on exterior surfaces of a vehicle such that microphones included in the array are in approximately the same plane, e.g., an xy-plane. In one embodiment, if an ability to determine a height, altitude, and/or vertical component associated with a sound source such as a siren is to be provided, microphones of an array may be arranged at different heights with respect to a vehicle. That is, microphones mounted or otherwise located on a vehicle are not limited to being in the same xy-plane, particularly if a location of a sound source relative to a vertical axis or z-axis is to be estimated.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method for detecting a location from which at least one sound signal originates, the method comprising:
obtaining, on a microphone array of a vehicle, the at least one sound signal from a sound source, the sound source being external to the vehicle, the vehicle having a plurality of sides; and
identifying, based on at least one measure associated with the at least one sound signal as obtained on the microphone array, at least a first side of the plurality of sides as being closest to the sound source.

2. The method of claim 1 wherein the microphone array includes a first plurality of microphones mounted on a first side of the plurality of sides of the vehicle including at least a first microphone mounted on the first side and a second plurality of microphones mounted on a second side of the plurality of sides of the vehicle including at least a second microphone mounted on the second side, adjacent microphones of the first plurality of microphones including the first microphone being spaced apart such that a body of the vehicle provides a threshold amount of attenuation, and wherein the at least one measure is a signal strength, the first microphone obtaining the at least one sound signal at a first signal strength and the second microphone obtaining the at least one sound signal at a second signal strength.

3. The method of claim 2 wherein the first signal strength is higher than the second signal strength, and wherein the first side is identified as being closest to the sound source, the method further including:
identifying the location from which the at least one sound signal originates as being on the first side.

4. The method of claim 2 wherein the first signal strength is higher than the second signal strength, and wherein identifying the at least first side of the plurality of sides as being closest to the sound source includes identifying the second side as being second closest to the source, the method further including:
identifying the location from which the at least one sound signal originates as being on both the first side and the second side.

5. The method of claim 2 wherein the vehicle is an autonomous vehicle, the method further including:
determining whether to cause the vehicle to take an action in response to the at least one sound signal.

6. The method of claim 2 further including:
processing the at least one sound signal, wherein processing the at least one sound signal includes identifying the at least one signal as being a siren associated with an emergency vehicle.

7. The method of claim 1 wherein the microphone array includes at least a first microphone and a second microphone, the first and second microphones being mounted on a first side of the plurality of sides, and wherein the at least one measure is a signal strength, the first microphone obtaining the at least one sound signal at a first signal strength and the second microphone obtaining the at least one sound signal at a second signal strength.

8. The method of claim 7 wherein the first signal strength is higher than the second signal strength, and wherein the first microphone is close to a second side of the plurality of sides and the second microphone is close to a third side of the plurality of sides, the method further including:
identifying the location from which the at least one sound signal originates as being on the second side.

9. Logic encoded in one or more tangible non-transitory, computer-readable media for execution and when executed operable to:
obtain, on a microphone array of a vehicle, the at least one sound signal from a sound source, the sound source being external to the vehicle, the vehicle having a plurality of sides; and
identify, based on at least one measure associated with the at least one sound signal as obtained on the microphone array, at least a first side of the plurality of sides as being closest to the sound source.

10. The logic of claim 9 wherein the microphone array includes at least a first pair of microphones including a first microphone mounted on a first side of the plurality of sides and at least a second pair of microphones including a second microphone mounted on a second side of the plurality of sides, and wherein the at least one measure is a signal strength, the first microphone obtaining the at least one sound signal at a first signal strength and the second microphone obtaining the at least one sound signal at a second signal strength.

11. The logic of claim 10 wherein the first signal strength is higher than the second signal strength, and wherein the first side is identified as being closest to the sound source, the logic further operable to:
identify the location from which the at least one sound signal originates as being on the first side.

12. The logic of claim 10 wherein the first signal strength is higher than the second signal strength, and wherein the logic operable to identify the at least first side of the plurality of sides as being closest to the sound source is operable to identify the second side as being second closest to the source, the further being operable to:
identify the location from which the at least one sound signal originates as being on both the first side and the second side.

13. The logic of claim 10 wherein the vehicle is an autonomous vehicle, the logic further operable to:
determine whether to cause the vehicle to take an action in response to the at least one sound signal.

14. The logic of claim 10, wherein the logic is further operable to:
process the at least one sound signal, wherein the logic operable to process the at least one sound signal is operable to identify the at least one signal as being a siren associated with an emergency vehicle.

15. The logic of claim 9 wherein the microphone array includes at least a first microphone and a second microphone, the first and second microphones being mounted on a first side of the plurality of sides, and wherein the at least one measure is a signal strength, the first microphone obtaining the at least one sound signal at a first signal strength and the second microphone obtaining the at least one sound signal at a second signal strength, the first signal strength being higher than the second signal strength, the first microphone being close to a second side of the plurality of sides and the second microphone being close to a third side of the plurality of sides, the logic further operable to:
identify the location from which the at least one sound signal originates as being on the second side.

16. A vehicle comprising:
a chassis;
a plurality of sides, the plurality of sides being supported on the chassis, the plurality of sides including at least a first side and a second side;
a microphone array, the microphone array including a plurality of microphones mounted on the plurality of sides, the microphone array configured to capture at least one signal from a source external to the vehicle, wherein the microphone array includes a first plurality of microphones and a second plurality of microphones, the first plurality of microphones being mounted on the first side and the second plurality of microphones being mounted on the second side;

a processor, the processor carried on the chassis; and logic, when executed by the processor, operable to process the at least one signal captured by the microphone array to determine at least one direction from which the at least one signal originates, wherein the logic operable to process the at least one signal includes logic operable to
  i) determine a first intensity difference based on the at least one signal across the first plurality of microphones at a first time,
  ii) determine a second intensity difference based on the at least one signal across the second plurality of microphones at the first time,
  iii) determine a third intensity difference based on the at least one signal across the first plurality of microphones at a second time,
  iv) determine a fourth intensity difference based on the at least one signal across the second plurality of microphones at the second time,
  v) estimate at least one of a speed of travel and a direction of travel of the source based on the first intensity difference, the second intensity difference, the third intensity difference, and the fourth intensity difference, and
  vi) predict at least one of a time and a destination at which the vehicle and the source are expected to cross paths based on the at least one of the speed of travel and the direction of travel.

17. The vehicle of claim 16 wherein the first plurality of microphones includes a first microphone and a second microphone mounted on the first side of the plurality of sides, and wherein the second plurality of microphones includes a third microphone and a fourth microphone mounted on the second side of the plurality of sides, the logic operable to predict the at least one of the time and the destination at which the vehicle and the source are expected to cross paths including logic operable to process a speed and a direction at which the vehicle travels.

18. The vehicle of claim 17 wherein the logic operable to process the at least one signal captured by the microphone array is operable to process the at least one signal captured by the first microphone, the second microphone, the third microphone, and the fourth microphone to determine a first signal strength associated with the first microphone, a second signal strength associated with the second microphone, a third signal strength associated with the third microphone, and a fourth signal strength associated with the fourth microphone.

19. The vehicle of claim 18 wherein the logic operable to process the at least one signal captured by the microphone array is operable to determine the at least one direction using the first signal strength, the second signal strength, the third signal strength, and the fourth signal strength.

20. The vehicle of claim 16 wherein the microphone array further includes a third plurality of microphones mounted on a third side of the plurality of sides and a fourth plurality of microphones mounted on a fourth side of the plurality of sides, and wherein each microphone of the microphone array is mounted at a first height associated with a vertical axis.

21. The method of claim 1 wherein the microphone array includes a plurality of microphones located on the first side of the vehicle, the plurality of microphones including a left microphone, a center microphone, and a right microphone, wherein the center microphone is positioned between the left microphone and the right microphone relative to a first axis, and wherein the center microphone is offset from the left microphone and the right microphone relative to a second axis.

22. The method of claim 1 wherein the microphone array includes a first pair of microphones and a second pair of microphones, the first pair of microphones being mounted on a first side of the plurality of sides, the second pair of microphones being mounted on a second side of the plurality of sides, the method further including:
  determining a first intensity difference based on the at least one sound signal across the first pair of microphones at a first time;
  determining a second intensity difference based on the at least one sound signal across the second pair of microphones at the first time;
  determining a third intensity difference based on the at least one sound signal across the first pair of microphones at a second time;
  determining a fourth intensity difference based on the at least one sound signal across the second pair of microphones at the second time;
  estimating at least one of a speed of travel and a direction of travel of the sound source based on the first intensity difference, the second intensity difference, the third intensity difference, and the fourth intensity difference; and
  estimating at least one of a time and a destination at which the vehicle and the sound source will cross paths based on the at least one of the speed of travel and the direction of travel.

23. The method of claim 1 wherein the vehicle has a body and the microphone array includes at least a first microphone and a second microphone, the first microphone and the second microphone being mounted on a first side of the plurality of sides, the first microphone being adjacent to the second microphone, and wherein the spacing between the first microphone and the second microphone enables the body to provide attenuation for the at least one signal.

* * * * *